United States Patent
Yang (10) Patent No.: US 11,808,361 B2
(45) Date of Patent: Nov. 7, 2023

(54) WATER SEPARATOR VALVE ASSEMBLY

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 197 days.

(21) Appl. No.: 17/501,574

(22) Filed: Oct. 14, 2021

(65) Prior Publication Data

US 2023/0124603 A1 Apr. 20, 2023

(51) Int. Cl.
| F16K 11/08 | (2006.01) |
| E03C 1/04 | (2006.01) |
| F16K 11/085 | (2006.01) |
| F16K 31/60 | (2006.01) |
| E03C 1/02 | (2006.01) |

(52) U.S. Cl.
CPC .......... *F16K 11/085* (2013.01); *E03C 1/0408* (2013.01); *F16K 31/602* (2013.01); *E03C 2001/026* (2013.01)

(58) Field of Classification Search
CPC ..... F16K 11/085; F16K 31/602; E03C 1/0408
See application file for complete search history.

(56) References Cited

U.S. PATENT DOCUMENTS

| 4,457,384 A | * | 7/1984 | Layton | ................. E21B 21/002 |
| | | | | 175/337 |
| 5,348,041 A | * | 9/1994 | Clark | ................. B01D 17/0214 |
| | | | | 137/433 |

FOREIGN PATENT DOCUMENTS

TW M314811 U 7/2007

* cited by examiner

*Primary Examiner* — Kevin R Barss
(74) *Attorney, Agent, or Firm* — Muncy, Geissler, Olds & Lowe, P.C.

(57) ABSTRACT

A water separator valve assembly is provided, including: a main body, including a chamber, first and second outlet pipe and an inlet pipe; a control assembly, including a valve member disposed in the main body and an elastic plug, the valve member including a base disposed in the chamber and a receiving portion disposed on the base, the base including inlet holes respectively in communication with an inlet channel in the main body, the receiving portion including a receiving hole and a through hole, the elastic plug being disposed in the receiving hole, the elastic plug being elastically abutted between a bottom wall of the receiving hole and an inner wall the chamber; wherein the valve member is rotatable relative to the main body to drive the elastic plug to seal the first outlet channel or an second outlet channel in the main body.

10 Claims, 9 Drawing Sheets

WATER SEPARATOR VALVE ASSEMBLY

BACKGROUND OF THE INVENTION

Field of the Invention

The present invention relates to a water separator valve assembly.

Description of the Prior Art

Most conventional shower devices are provided with a water separator assembly to switch the water outlet state, which allows choosing to use the top spray shower or the hand shower to discharge water.

In the prior art, such as in TW M314811, the main body of the water separator assembly includes a control member accommodated therein, the inside of a lower cover of the control member receives a ceramic member, the ceramic member includes perforations corresponding to outlet pipes in communication with the interior chamber of the main body, and the ceramic member contacts a valve member to perform sealing of the outlet hole. However, the ceramic member results in high cost of the water separator valve assembly.

The present invention is, therefore, arisen to obviate or at least mitigate the above-mentioned disadvantages.

SUMMARY OF THE INVENTION

The main object of the present invention is to provide a water separator valve assembly which is capable of being switched to different discharging states and is pretty leaking-proof.

To achieve the above and other objects, the present invention provides a water separator valve assembly is provided, including: a main body, including a chamber, a first outlet pipe, a second outlet pipe and an inlet pipe which are in communication with the chamber, a first outlet channel being disposed between the first outlet pipe and the chamber, a second outlet channel being disposed between the second outlet pipe and the chamber, an inlet channel being disposed between the inlet pipe and the chamber; a control assembly, including a valve member and an elastic plug, the valve member being disposed in the main body, the valve member including a base and a receiving portion disposed on the base, the base being disposed in the chamber, an outer circumferential wall of the base including a plurality of inlet holes disposed therethrough, the plurality of inlet holes being respectively in communication with the inlet channel, the receiving portion including a receiving hole and a through hole in communication with the receiving hole and the chamber, the elastic plug being disposed in the receiving hole, the elastic plug being elastically abutted against and between a bottom wall of the receiving hole and an inner wall the chamber; wherein the valve member is rotatable relative to the main body to drive the elastic plug to move between a first position where the elastic plug seals the first outlet channel and a second position where the elastic plug seals the second outlet channel.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 10 for a preferable embodiment of the present invention. A water separator valve assembly 1 of the present invention includes a main body 10 and a control assembly 20.

Figure 1:
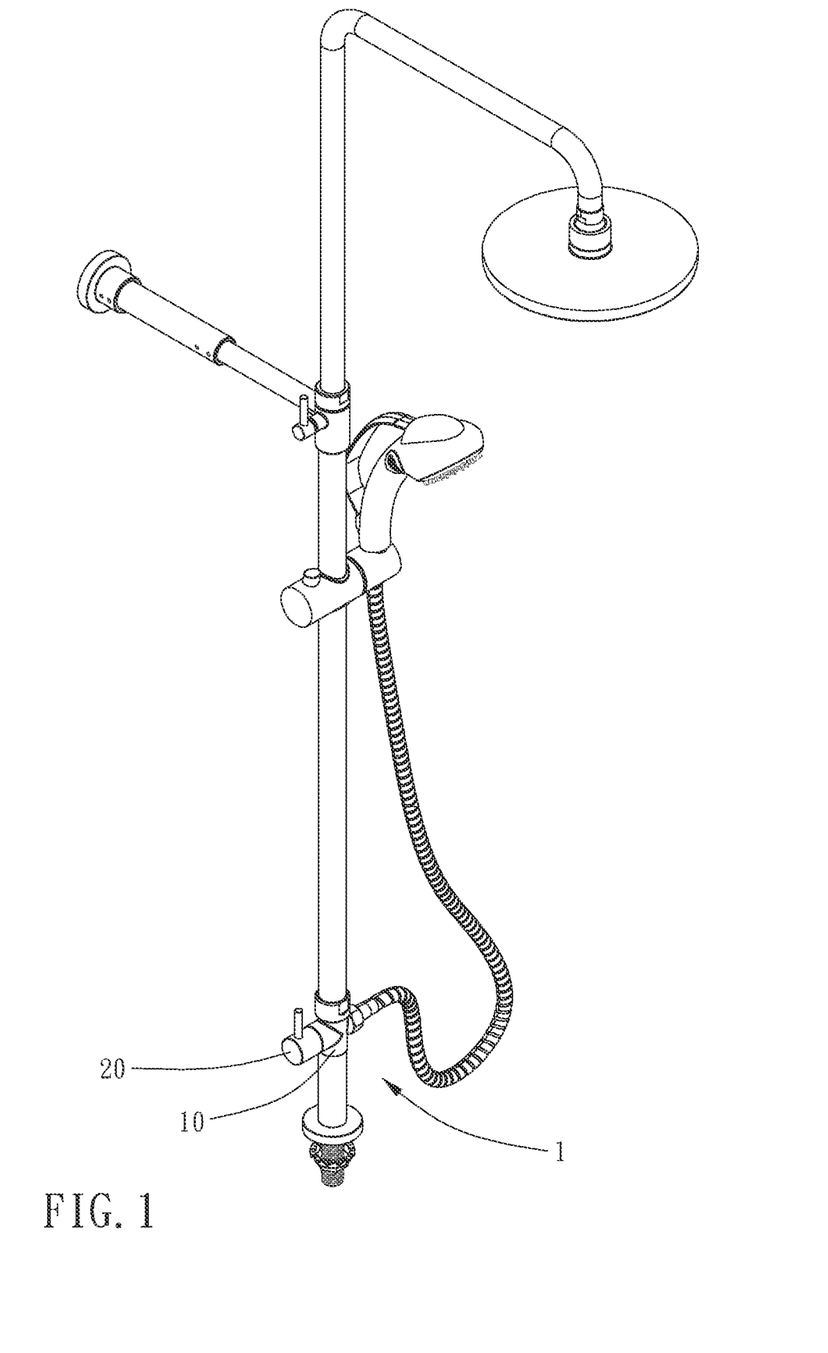
FIG. 1 is a stereogram of a preferable embodiment of the present invention.
Figure 2:
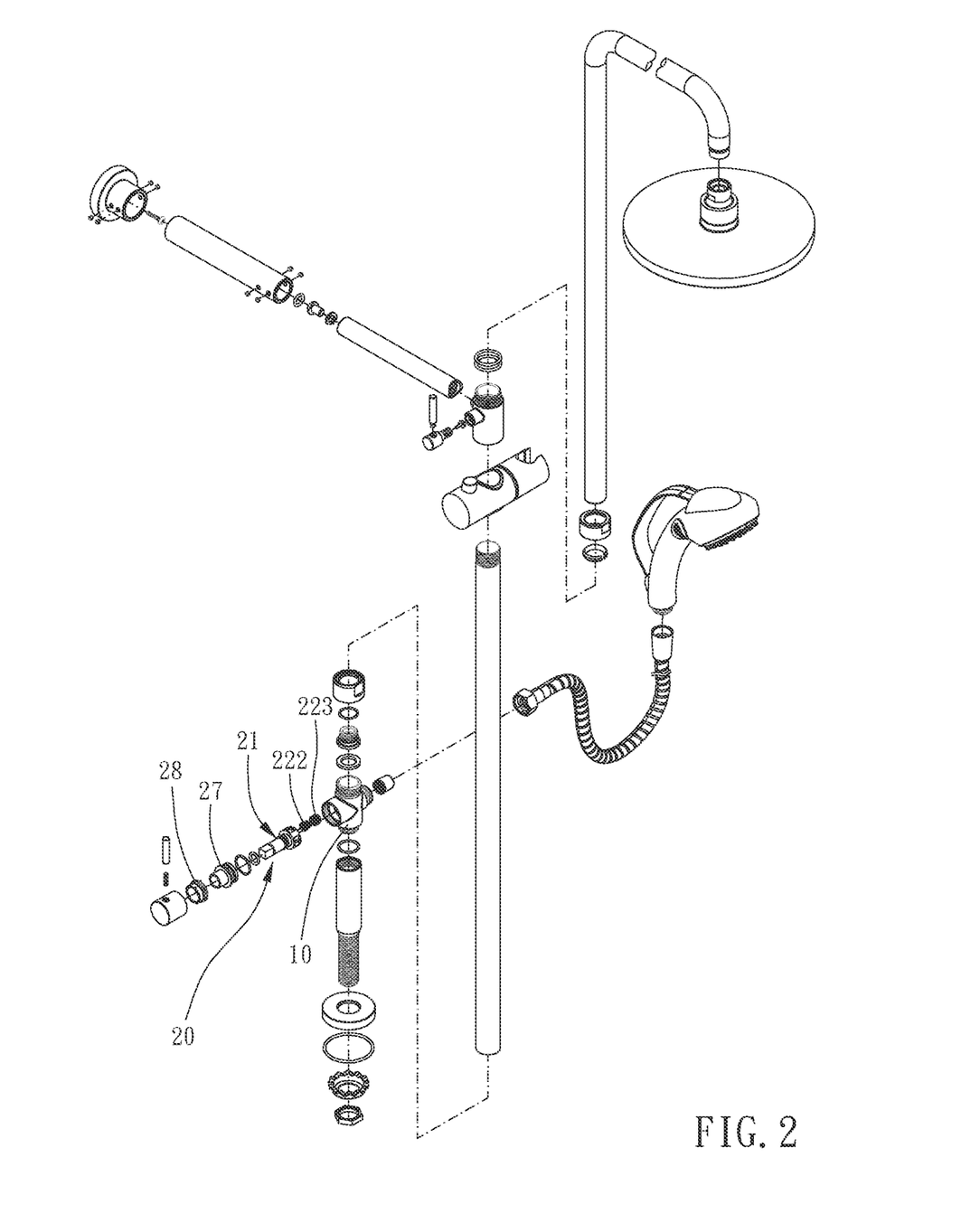
FIG. 2 is a breakdown drawing of a preferable embodiment of the present invention.
Figure 3:
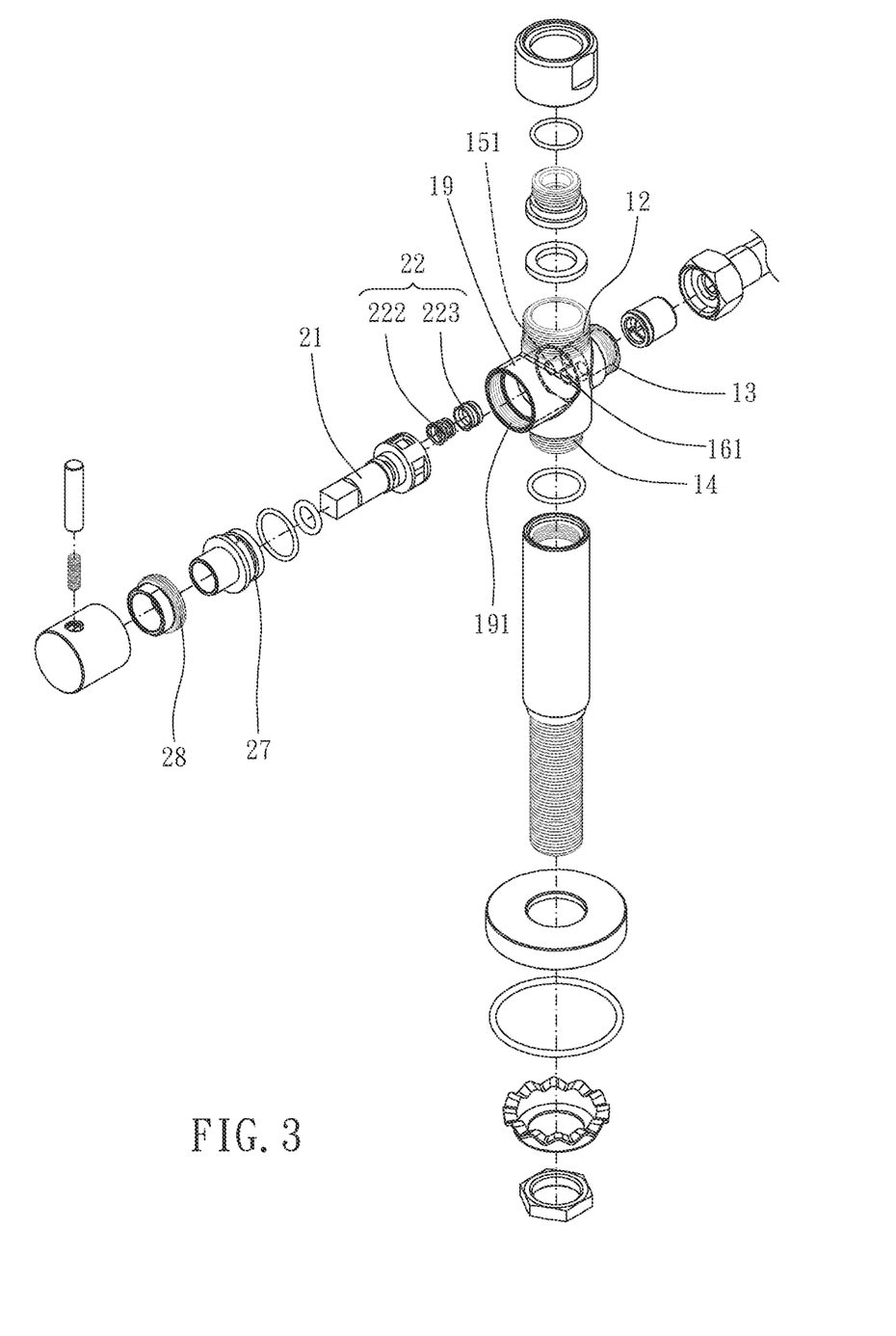
FIG. 3 is a partial breakdown drawing of a preferable embodiment of the present invention.
Figure 4:
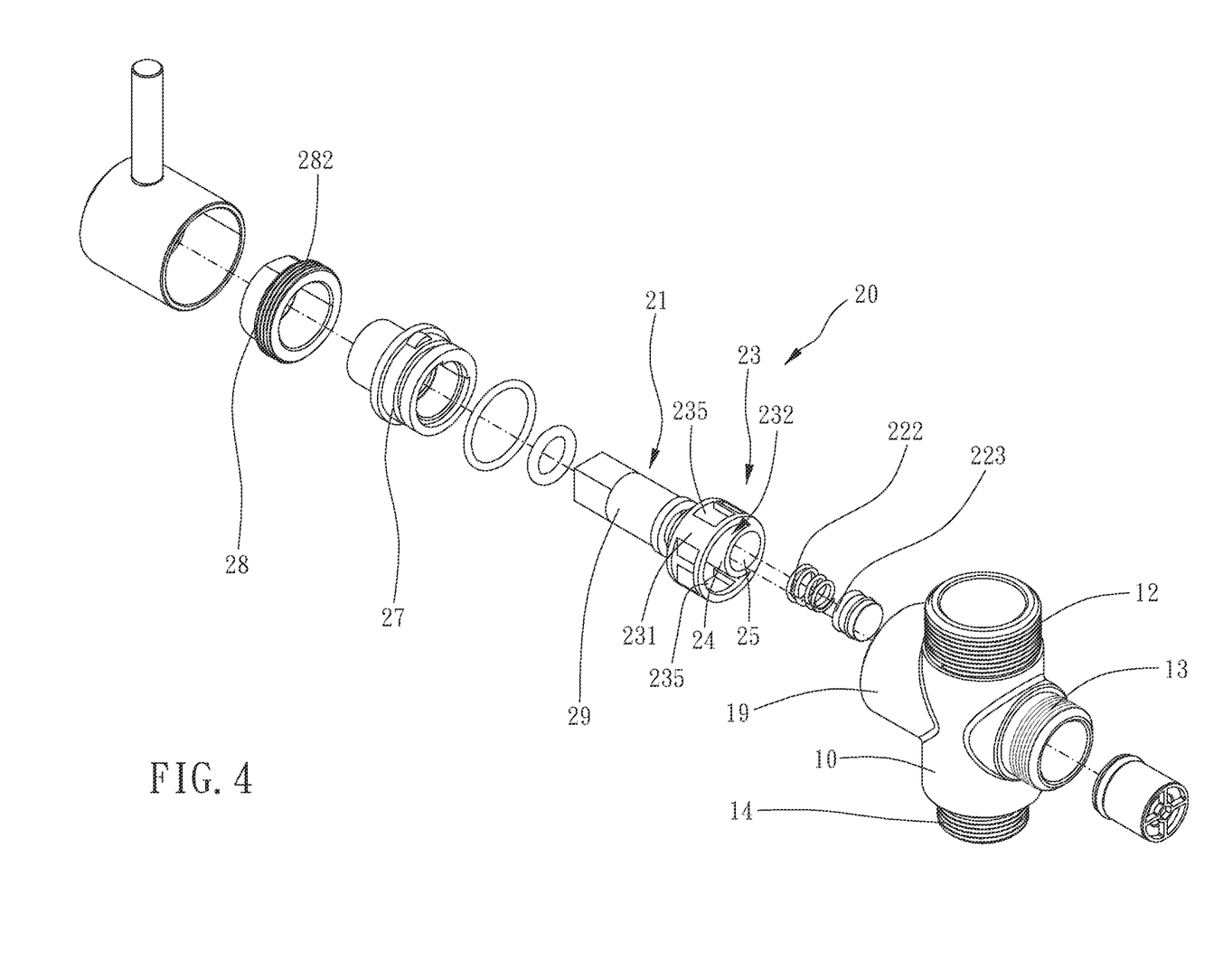
FIG. 4 is another partial breakdown drawing of a preferable embodiment of the present invention.
Figure 5:
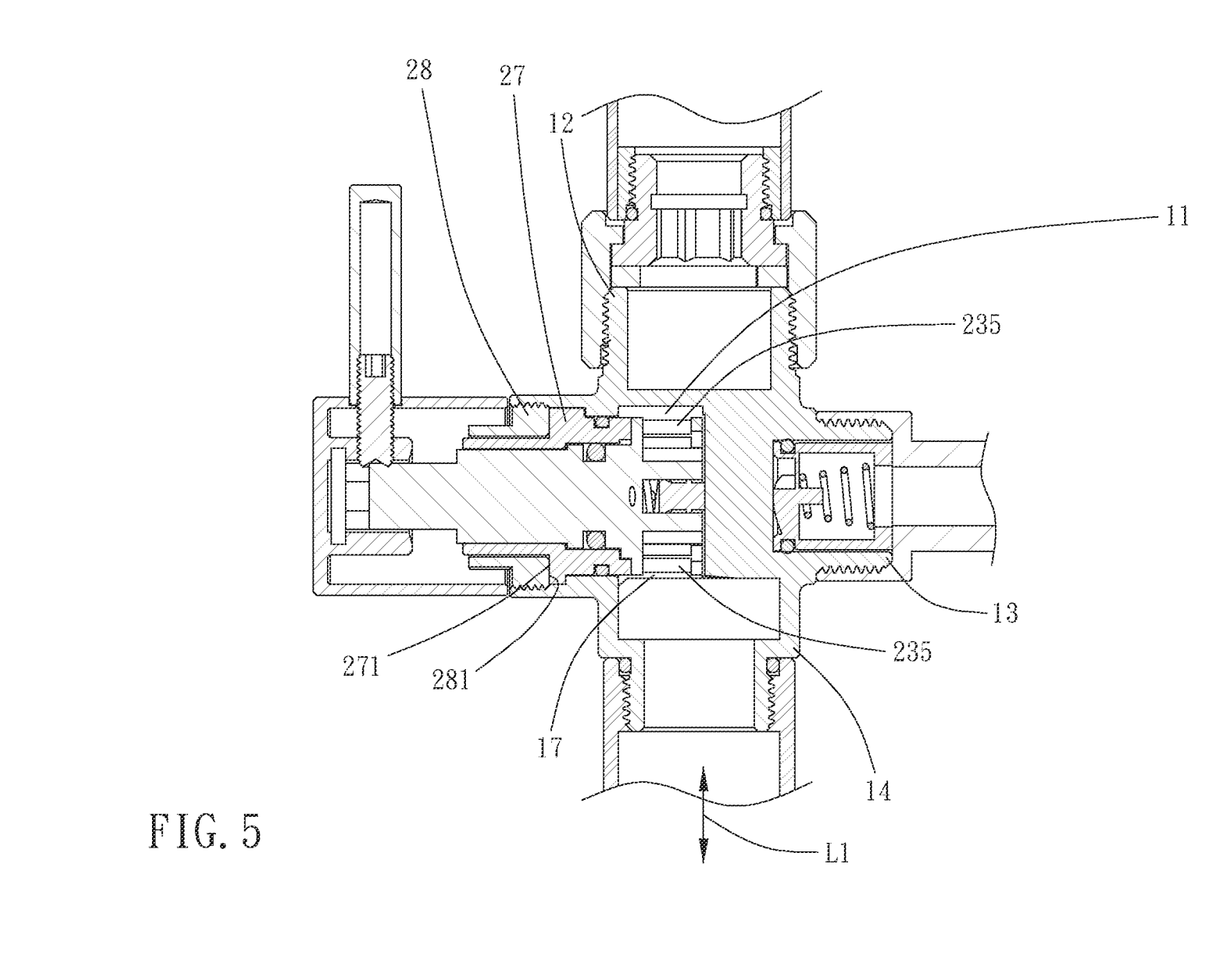
FIG. 5 is a cross-sectional view of a preferable embodiment of the present invention.
Figure 6:
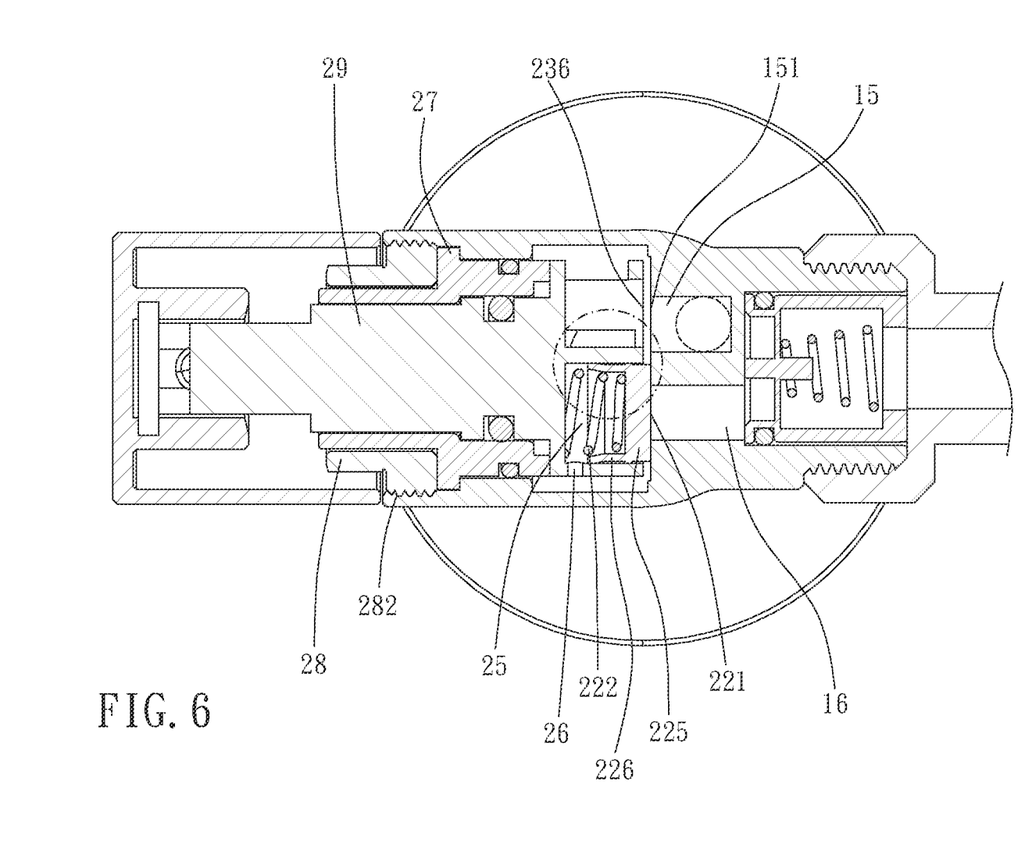
FIG. 6 is a cross-sectional view showing an elastic plug sealing a second outlet channel according to a preferable embodiment of the present invention.
Figure 6A:
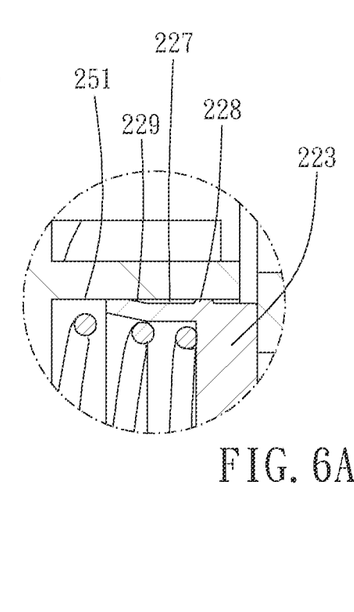
FIG. 6A is a partial enlargement of FIG. 6.
Figure 7:
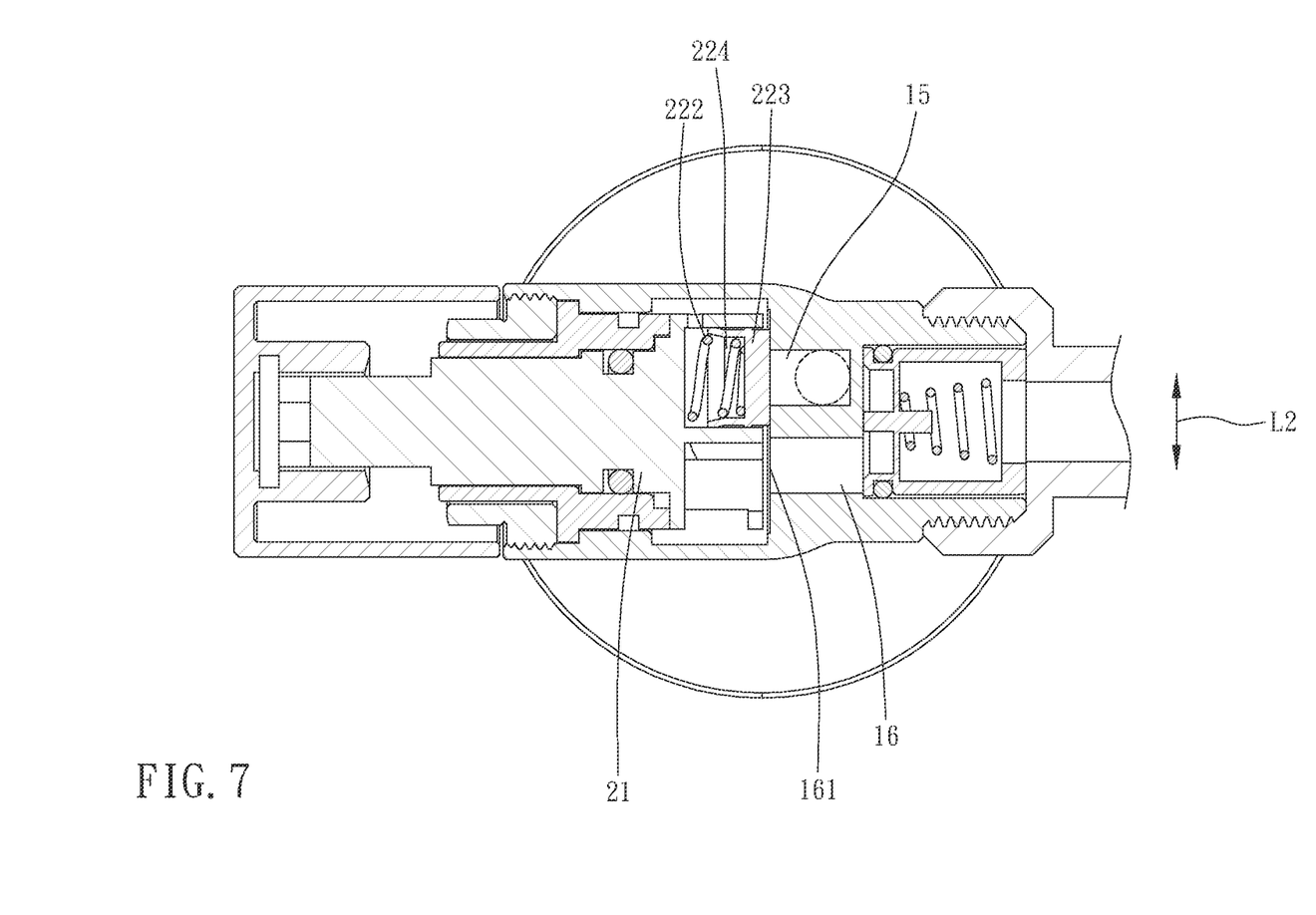
FIG. 7 is a cross-sectional view showing an elastic plug sealing a first outlet channel according to a preferable embodiment of the present invention.

The main body 10 includes a chamber 11, a first outlet pipe 12, a second outlet pipe 13 and an inlet pipe 14 which are in communication with the chamber 11. A first outlet channel 15 is disposed between the first outlet pipe 12 and the chamber 11, a second outlet channel 16 is disposed between the second outlet pipe 13 and the chamber 11, and an inlet channel 17 is disposed between the inlet pipe 14 and the chamber 11. The control assembly 20 includes a valve member 21 and an elastic plug 22, the valve member 21 is disposed in the main body 10, and the valve member 21 includes a base 23 and a receiving portion 24 disposed on the base 23. In this embodiment, the receiving portion 24 and the base 23 are integrally formed of one piece, the base 23 is disposed in the chamber 11, an outer circumferential wall 231 of the base 23 includes a plurality of inlet holes 235 disposed therethrough, the plurality of inlet holes 235 are respectively in communication with the inlet channel 17, the receiving portion 24 includes a receiving hole 25 and a through hole 26 in communication with the receiving hole 25 and the chamber 11, the elastic plug 22 is disposed in the receiving hole 25, the elastic plug 22 is elastically abutted against and between a bottom wall of the receiving hole 25 and an inner wall 18 of the chamber 11. The valve member 21 is rotatable relative to the main body 10 to drive the elastic plug 22 to move between a first position where the elastic plug 22 seals the first outlet channel 15 (FIG. 7) and a second position where the elastic plug 22 seals the second outlet channel 16 (FIG. 6). Whereby, the valve member 21 can be operated to control sealing of the first outlet channel 15 or the second outlet channel 16, and the elastic plug 22 can recover automatically.

The receiving portion 24 is eccentrically arranged in the base 23, the base 23 defines a central axis A, and the central axis A extends through the receiving hole 25. The first outlet channel 15 includes a first discharging opening 151 disposed through the inner wall 18 of the chamber 11, and the second outlet channel 16 includes a second discharging opening 161 disposed through the inner wall 18 of the chamber 11. The elastic plug 22 includes an end face 221 facing toward the inner wall 18. When the elastic plug 22 is in the first position, the end face 221 completely seals the first discharging opening 151 and is abutted annularly against a portion of the inner wall 18 of the chamber 11 around the first discharging opening 151; and when the elastic plug 22 is in the second position, the end face 221 completely seals the second discharging opening 161 and is abutted annularly against a portion of the inner wall 18 of the chamber 11 around the second discharging opening 161. By utilizing the pressure of inlet water, the elastic plug 22 seals the first discharging opening 151 or the second discharging opening 161.

The inlet channel 17 is open toward a first direction L1, the first discharging opening 151 and the second discharging opening 161 are arranged on a second direction L2, the second direction L2 is lateral to the first direction L1, the plurality of inlet holes 235 are disposed at two opposing sides of the base 23, and the plurality of inlet holes 235 are disposed at two opposing sides of the receiving portion 24. When the elastic plug 22 is in the first position, one of the plurality of inlet holes 235 corresponds to the inlet channel 17; and when the elastic plug 22 is in the second position, another one of the plurality of inlet holes 235 corresponds to the inlet channel 17. As a result, when the elastic plug 22 is in the first position or in the second position, the inlet channel 17 corresponds to one of the plurality of inlet holes 235, which allows inlet flow of the water.

The elastic plug 22 includes an elastic member 222 and a sleeve 223, the sleeve 223 is disposed around the elastic member 222, and the elastic member 222 is abutted against the bottom wall of the receiving hole 25 and biases the sleeve 223 toward the inner wall 18 of the chamber 11. Preferably, the sleeve 223 is a rubber sleeve. In this embodiment, the sleeve 223 includes a recess 224, the elastic member 222 is received within the recess 224 and abutted against a bottom wall 225 of the recess 224; the sleeve 223 includes the bottom wall 225 and a side wall 226 laterally and annularly connected with the bottom wall 225, the side wall 226 includes an outer side portion, the outer side portion faces toward an hole wall 251 of the receiving hole 25, the outer side portion includes an annular projection 228, an annular inclined surface 229 and an annular groove 227, the annular projection 228 and the annular inclined surface 229 define the annular groove 227, and the annular projection 228 is abutted annularly against the hole wall 251 of the receiving hole 25, such that the sleeve 223 can move smoothly in the receiving hole 25.

The through hole 26 is more adjacent to the bottom wall of the receiving hole 25 than the sleeve 223. At least part of the through hole 26 is not covered by the elastic plug 22 such that the receiving hole 25 is in communication with the chamber 11 so that the flow in the receiving hole 25 and the chamber 11 can drive the elastic plug 22 to recover.

Figure 8:
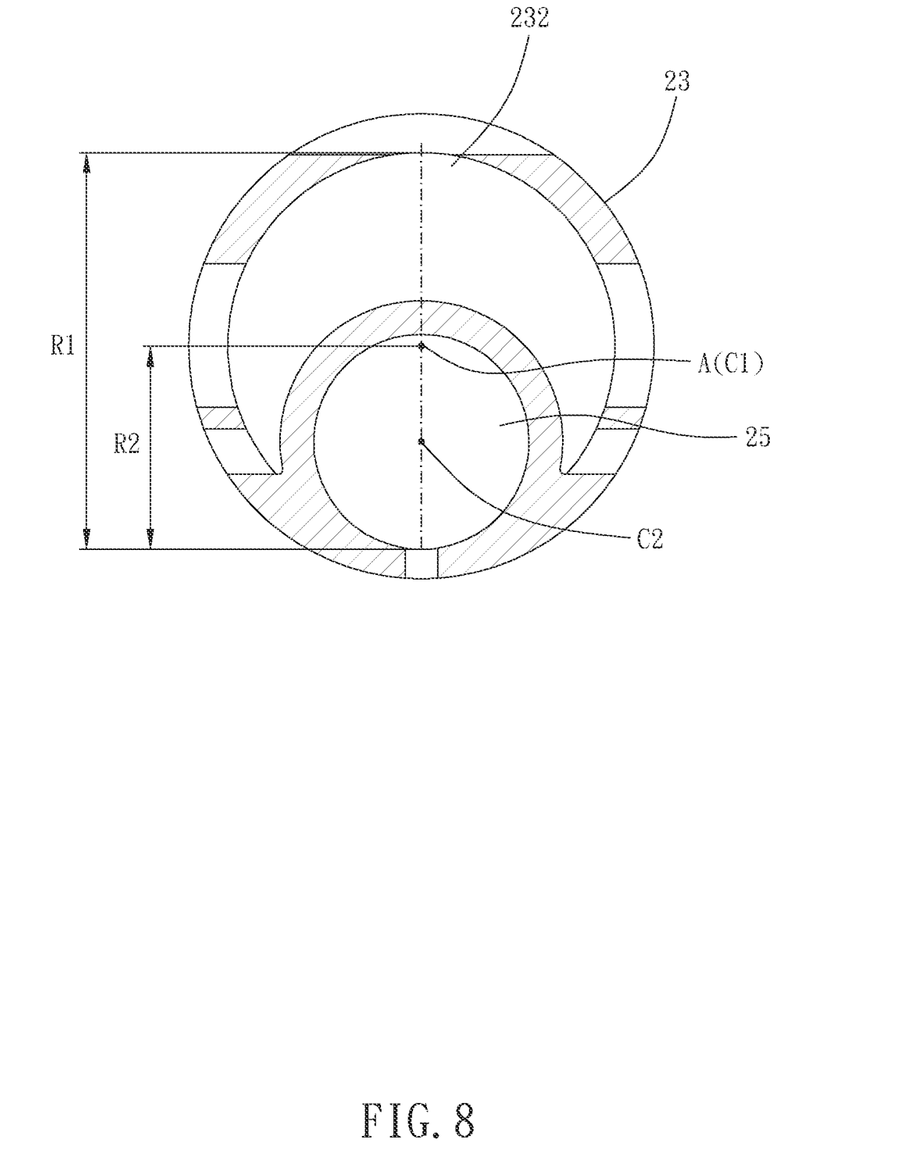
FIG. 8 is a cross-sectional view of a base of a preferable embodiment of the present invention.
Figure 9:
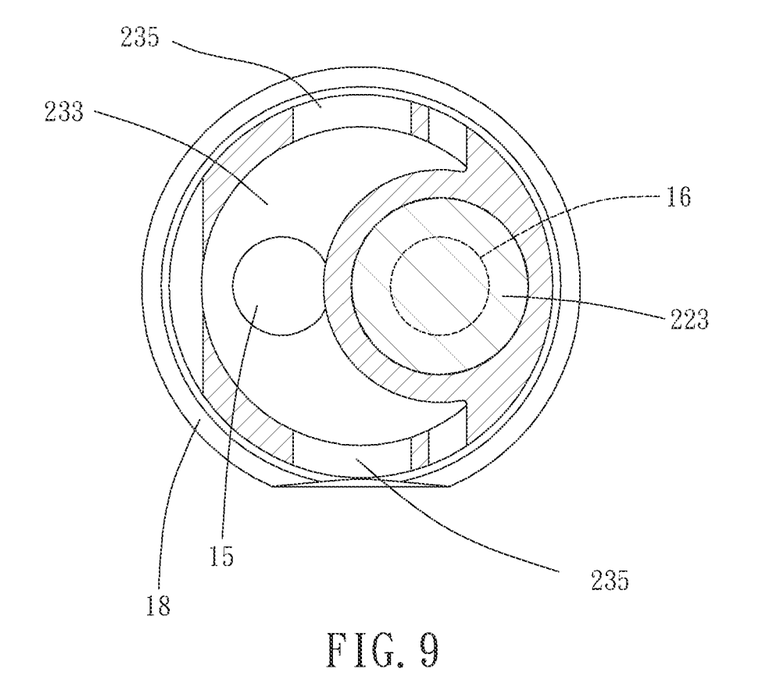
FIG. 9 is a drawing showing an elastic plug sealing a second discharging opening according to a preferable embodiment of the present invention.
Figure 10:
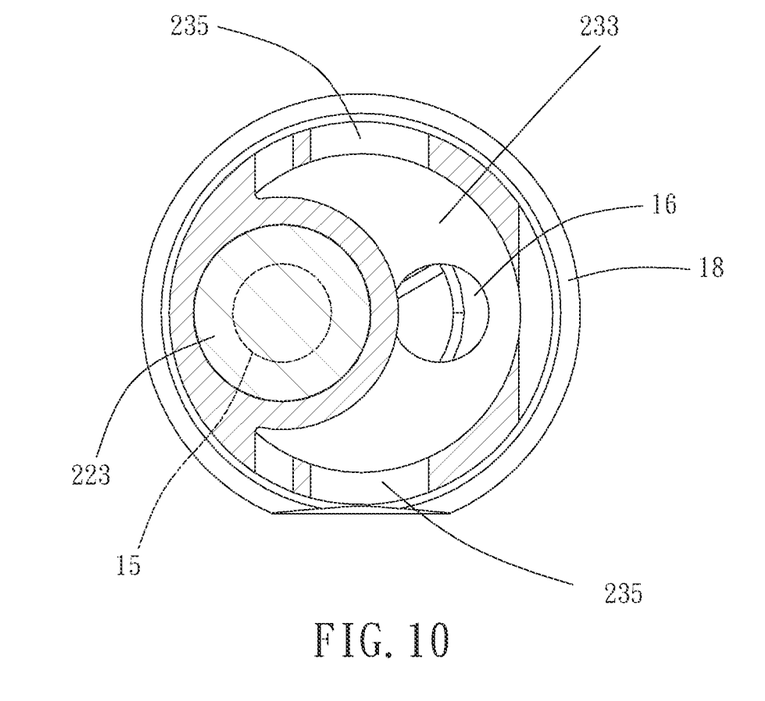
FIG. 10 is a drawing showing an elastic plug sealing a first discharging opening according to a preferable embodiment of the present invention.

The base 23 further includes a concave portion 232 and a discharging compartment 233, the outer circumferential wall 231 defines the concave portion 232, the receiving portion 24 is disposed in the concave portion 232, the receiving portion 24 and the outer circumferential wall 231 define the discharging compartment 233 therebetween, the discharging compartment 233 includes a discharging opening 236, and the plurality of inlet holes 235, the discharging compartment 233 and the discharging opening 236 are in communication with one another. When the elastic plug 22 is in the first position, the discharging opening 236 corresponds to and is in communication with the second outlet channel 16; and when the elastic plug 22 is in the second position, the discharging opening 236 corresponds to and is in communication with the first outlet channel 15. As viewed in an axial direction of the valve member 21, as shown in FIG. 8, the concave portion 232 has a first diametric dimension R1 along a line on which a center C1 of the concave portion 232 and a center C2 of the receiving hole 25, and the receiving hole 25 has a second diametric dimension R2 larger than 0.5 times the first diametric dimension R1. In this embodiment, the discharging compartment 233 is crescent, thus being capable of changing outlet volume of water by rotation of the valve member 21.

The main body 10 further includes a tubular portion 19, the control assembly 20 further includes a tubular member 27 and a locking ring 28, the valve member 21 further includes a shaft portion 29 connected with the base 23, the base 23 and the shaft portion 29 are axially arranged, the shaft portion 29 is disposed through the tubular portion 19, the tubular member 27 is disposed around the valve member 21, the locking ring 28 is disposed around the tubular member 27, the tubular member 27 includes a first abutting face 271, and the locking ring 28 includes a second abutting face 281 abutted axially against the first abutting face 271. The locking ring 28 includes an outer threaded section 282, an inner wall of the tubular portion 19 includes an inner threaded section 191, and the outer threaded section 282 and the inner threaded section 191 are screwed with each other, which is easy to assemble/disassemble the control assembly 20.

In use, as the valve member 21 is rotated to move the elastic plug 22 to be in the first position, the elastic plug 22 is abutted against the inner wall 18 of the chamber 11 and seals the first outlet channel 15, the discharging opening 236 of the discharging compartment 233 corresponds to the second outlet channel 16, and the water from the inlet channel 17 flows through each said inlet hole 235 to the discharging compartment 233, is discharged from the discharging opening 236 and flows into the second outlet channel 16; as the valve member 21 is rotated to move the elastic plug 22 to be in the second position, the elastic plug 22 is abutted against the inner wall 18 of the chamber 11 and seals the second outlet channel 16, the discharging opening 236 of the discharging compartment 233 corresponds to the first outlet channel 15, and the water from the inlet channel 17 flows through each said inlet hole 235 to the discharging compartment 233, is discharged from the discharging opening 236 and flows into the first outlet channel 15.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A water separator valve assembly, including:
a main body, including a chamber, a first outlet pipe, a second outlet pipe and an inlet pipe which are in communication with the chamber, a first outlet channel being disposed between the first outlet pipe and the chamber, a second outlet channel being disposed between the second outlet pipe and the chamber, an inlet channel being disposed between the inlet pipe and the chamber; and
a control assembly, including a valve member and an elastic plug, the valve member being disposed in the main body, the valve member including a base and a receiving portion disposed on the base, the base being disposed in the chamber, an outer circumferential wall of the base including a plurality of inlet holes disposed therethrough, the plurality of inlet holes being respectively in communication with the inlet channel, the receiving portion including a receiving hole and a through hole in communication with the receiving hole and the chamber, the elastic plug being disposed in the receiving hole, the elastic plug being elastically abutted against and between a bottom wall of the receiving hole and an inner wall the chamber;

wherein the valve member is rotatable relative to the main body to drive the elastic plug to move between a first position where the elastic plug seals the first outlet channel and a second position where the elastic plug seals the second outlet channel.

2. The water separator valve assembly of claim 1, wherein the receiving portion is eccentrically arranged in the base, the base defines a central axis, and the central axis extends through the receiving hole.

3. The water separator valve assembly of claim 1, wherein the elastic plug includes an elastic member and a sleeve, the sleeve is disposed around the elastic member, and the elastic member is abutted against the bottom wall of the receiving hole and biases the sleeve toward the inner wall of the chamber.

4. The water separator valve assembly of claim 3, wherein the sleeve includes a recess, and the elastic member is received within the recess and abutted against a bottom wall of the recess.

5. The water separator valve assembly of claim 3, wherein at least part of the through hole is not covered by the elastic plug.

6. The water separator valve assembly of claim 1, wherein the base further includes a concave portion and a discharging compartment, the outer circumferential wall defines the concave portion, the receiving portion is disposed in the concave portion, the receiving portion and the outer circumferential wall define the discharging compartment therebetween, the discharging compartment includes a discharging opening, and the plurality of inlet holes, the discharging compartment and the discharging opening are in communication with one another; when the elastic plug is in the first position, the discharging opening corresponds to and is in communication with the second outlet channel; when the elastic plug is in the second position, the discharging opening corresponds to and is in communication with the first outlet channel.

7. The water separator valve assembly of claim 1, wherein the first outlet channel includes a first discharging opening disposed through the inner wall of the chamber, the second outlet channel includes a second discharging opening disposed through the inner wall of the chamber, and the elastic plug includes an end face facing toward the inner wall; when the elastic plug is in the first position, the end face completely seals the first discharging opening and is abutted annularly against a portion of the inner wall of the chamber around the first discharging opening; when the elastic plug is in the second position, the end face completely seals the second discharging opening and is abutted annularly against a portion of the inner wall of the chamber around the second discharging opening.

8. The water separator valve assembly of claim 1, wherein the inlet channel is open toward a first direction, the first outlet channel includes a first discharging opening disposed through the inner wall of the chamber, the second outlet channel includes a second discharging opening disposed through the inner wall of the chamber, the first discharging opening and the second discharging opening are arranged on a second direction, the second direction is lateral to the first direction, the plurality of inlet holes are disposed at two opposing sides of the base; when the elastic plug is in the first position, one of the plurality of inlet holes corresponds to the inlet channel; when the elastic plug is in the second position, another one of the plurality of inlet holes corresponds to the inlet channel.

9. The water separator valve assembly of claim 8, wherein the plurality of inlet holes are disposed at two opposing sides of the receiving portion; the receiving portion is eccentrically arranged in the base, the base defines a central axis, and the central axis extends through the receiving hole; the elastic plug includes an elastic member and a sleeve, the sleeve is disposed around the elastic member, and the elastic member is abutted against the bottom wall of the receiving hole and biases the sleeve toward the inner wall of the chamber; the sleeve includes a recess, and the elastic member is received within the recess and abutted against a bottom wall of the recess; the sleeve is a rubber sleeve; the elastic plug does not seal the through hole; the base further includes a concave portion and a discharging compartment, the outer circumferential wall defines the concave portion, the receiving portion is disposed in the concave portion, the receiving portion and the outer circumferential wall define the discharging compartment, the discharging compartment includes a discharging opening, and the plurality of inlet holes, the discharging compartment and the discharging opening are in communication with one another; when the elastic plug is in the first position, the discharging opening corresponds to and is in communication with the second outlet channel; when the elastic plug is in the second position, the discharging opening corresponds to and is in communication with the first outlet channel; the discharging compartment is crescent; as viewed in an axial direction of the valve member, the concave portion has a first diametric dimension along a line on which a center of the concave portion and a center of the receiving hole, the receiving hole has a second diametric dimension larger than 0.5 times the first diametric dimension; the through hole is more adjacent to the bottom wall of the receiving hole than the sleeve; the first outlet channel includes a first discharging opening disposed through the inner wall of the chamber, the second outlet channel includes a second discharging opening disposed through the inner wall of the chamber, and the elastic plug includes an end face facing toward the inner wall; when the elastic plug is in the first position, the end face completely seals the first discharging opening and is abutted annularly against a portion of the inner wall of the chamber around the first discharging opening; when the elastic plug is in the second position, the end face completely seals the second discharging opening and is abutted annularly against a portion of the inner wall of the chamber around the second discharging opening; the main body further includes a tubular portion, the control assembly further includes a tubular member and a locking ring, the valve member further includes a shaft portion connected with the base, the base and the shaft portion are axially arranged, the shaft portion is disposed through the tubular portion, the tubular member is disposed around the valve member, the locking ring is disposed around the tubular member, the tubular member includes a first abutting face, the locking ring includes a second abutting face abutted axially against the first abutting face, the locking ring includes an outer threaded section, an inner wall of the tubular portion includes an inner threaded section, and the outer threaded section and the inner threaded section are screwed with each other; the sleeve includes a bottom wall and a side wall laterally and annularly connected with the bottom wall of the sleeve, the side wall includes an outer side portion, the outer side portion faces toward an hole wall of the receiving hole, the outer side portion includes an annular projection, an annular inclined surface and an annular groove, the annular projection and the annular inclined surface define the annular groove, and the annular projection is abutted annularly against the hole wall of the receiving hole.

10. The water separator valve assembly of claim 1, wherein the sleeve includes a bottom wall and a side wall laterally and annularly connected with the bottom wall of the sleeve, the side wall includes an outer side portion, the outer side portion faces toward an hole wall of the receiving hole, the outer side portion includes an annular projection, an annular inclined surface and an annular groove, the annular projection and the annular inclined surface define the annular groove, and the annular projection is abutted annularly against the hole wall of the receiving hole.

* * * * *